US 12,311,888 B2

(12) United States Patent
Buttermore

(10) Patent No.: US 12,311,888 B2
(45) Date of Patent: May 27, 2025

(54) APPARATUS AND METHOD FOR ACTIVE CARGO CARRIER MOUNTING SYSTEM

(71) Applicant: Lyell Loomis, Inc., Gunnison County, CO (US)

(72) Inventor: Neil Thomas Buttermore, Gunnison County, CO (US)

(73) Assignee: Lyell Loomis, Inc., Gunnison County, CO (US)

( * ) Notice: Subject to any disclaimer, the term of this patent is extended or adjusted under 35 U.S.C. 154(b) by 0 days.

(21) Appl. No.: 18/589,207

(22) Filed: Feb. 27, 2024

(65) Prior Publication Data

US 2024/0198917 A1    Jun. 20, 2024

Related U.S. Application Data

(63) Continuation of application No. 18/133,195, filed on Apr. 11, 2023, now Pat. No. 11,926,288, which is a continuation of application No. 17/557,390, filed on Dec. 21, 2021, now Pat. No. 11,648,883.

(60) Provisional application No. 63/128,637, filed on Dec. 21, 2020.

(51) Int. Cl.
*B60R 9/058* (2006.01)
*B60R 11/00* (2006.01)

(52) U.S. Cl.
CPC ....... *B60R 9/058* (2013.01); *B60R 2011/0056* (2013.01)

(58) Field of Classification Search
CPC . B60R 9/058; B60R 2011/0056; B60R 11/04; B60R 9/08; B60R 9/10; B60R 2011/004
See application file for complete search history.

(56) References Cited

U.S. PATENT DOCUMENTS

| | | | |
|---|---|---|---|
| 2,009,721 A * | 7/1935 | Williams | F16B 47/00 248/362 |
| 4,616,215 A | 10/1986 | Maddalena | |
| 4,925,225 A | 5/1990 | Dost | |
| 5,244,242 A | 9/1993 | Goedecke et al. | |
| 5,795,001 A | 8/1998 | Burke | |
| 6,817,639 B2 | 11/2004 | Schmalz et al. | |
| 7,677,622 B2 | 3/2010 | Dunkmann et al. | |
| 9,091,612 B2 | 7/2015 | Lehmann | |
| 9,527,605 B1 | 12/2016 | Gentry et al. | |
| 9,573,684 B2 | 2/2017 | Kimchi et al. | |

(Continued)

FOREIGN PATENT DOCUMENTS

| | | |
|---|---|---|
| CN | 104323657 A | 2/2015 |
| CN | 104622187 A | 5/2015 |

(Continued)

OTHER PUBLICATIONS

"Freedom IQ Vacuum System" Information for Use pamphlet, Rev A, 2019, 20 pages, FreedomInnovations, LLC, Irving, CA.

(Continued)

*Primary Examiner* — Brian D Nash
(74) *Attorney, Agent, or Firm* — Bamert Regan PLLC

(57) ABSTRACT

Embodiments of active cargo carrier mounting system secure a cargo carrier to a top surface of a vehicle using at least one vacuum pump fluidly coupled to a plurality of vacuum cups configured to secure the active cargo carrier mounting system to a surface of the vehicle.

20 Claims, 8 Drawing Sheets

(56) References Cited

U.S. PATENT DOCUMENTS

| | | | |
|---|---|---|---|
| 9,581,148 | B1 | 2/2017 | Solomon et al. |
| 9,821,721 | B2 | 11/2017 | Casagrande et al. |
| 10,267,453 | B2 | 4/2019 | Casagrande et al. |
| 10,483,142 | B1 | 11/2019 | Tan et al. |
| 10,514,024 | B1 | 12/2019 | Shoemaker, Jr. |
| 10,723,276 | B2 | 7/2020 | Casagrande |
| 10,737,632 | B2 | 8/2020 | Casagrande et al. |
| 11,161,460 | B2* | 11/2021 | Casagrande .............. B60R 9/10 |
| 11,559,906 | B1* | 1/2023 | Buttermore .......... B25J 15/0616 |
| 11,892,119 | B1* | 2/2024 | Zeng .................... F16M 11/205 |
| 2005/0119789 | A1 | 6/2005 | Seemann |
| 2009/0242719 | A1 | 10/2009 | Carnevali |
| 2013/0299667 | A1 | 11/2013 | Casagrande |
| 2015/0375401 | A1 | 12/2015 | Dunkmann et al. |
| 2016/0023762 | A1 | 10/2016 | Wang et al. |
| 2017/0197719 | A1 | 7/2017 | Kwon et al. |
| 2019/0077027 | A1 | 11/2019 | Tanaka et al. |
| 2020/0169650 | A1* | 5/2020 | Fellinger .............. G03B 17/561 |
| 2020/0198546 | A1 | 6/2020 | Casagrande et al. |
| 2020/0247539 | A1 | 8/2020 | Shoemaker, Jr. |
| 2020/0331406 | A1 | 10/2020 | Casagrande |
| 2022/0075057 | A1* | 3/2022 | Jones, II ................. B60R 11/04 |
| 2022/0258674 | A1* | 8/2022 | Polster ..................... B60R 9/00 |
| 2023/0071906 | A1* | 3/2023 | Polster ................... B60R 9/058 |
| 2024/0034246 | A1* | 2/2024 | Aggarwal ............... F16B 47/00 |

FOREIGN PATENT DOCUMENTS

| | | |
|---|---|---|
| CN | 105757110 B | 6/2018 |
| CN | 109552194 A | 4/2019 |
| CN | 114379465 A | 4/2022 |
| KR | 20080054468 B2 | 6/2008 |
| WO | 2014043261 A1 | 3/2014 |
| WO | 2018227203 A1 | 12/2018 |

OTHER PUBLICATIONS

"Static-Control Vacuum Pads for Uneven Surfaces" by McMaster-Carr, Web page , 1 page, Apr. 9, 2021.

"Vacuum Controllers, Gauges, and Systems" by Cole-Parmer Instrument Company, LLC, Web page , 4 pages, Mar. 8, 2022.

"Vacuum Pads for Uneven Surfaces" by McMaster-Carr, Web page , 2 pages, Apr. 9, 2021.

* cited by examiner

APPARATUS AND METHOD FOR ACTIVE CARGO CARRIER MOUNTING SYSTEM

PRIORITY CLAIM

This application claims priority to copending U.S. application Ser. No. 18/133,195, filed on Mar. 11, 2023, entitled Apparatus and Method For Active Cargo Carrier Mounting System, which claims priority to copending U.S. application Ser. No. 17/557,390, filed on Dec. 21, 2021, entitled Apparatus and Method For Active Cargo Carrier Mounting System, which claims priority to copending U.S. Provisional Application, Ser. No. 63/128,637, filed on Dec. 21, 2020, entitled Apparatus and Method For Active Cargo Carrier Mounting System, which are hereby incorporated by reference in their entirety for all purposes.

BACKGROUND OF THE INVENTION

Cargo carriers, also known as roof boxes, ski boxes, cargo boxes, roof top boxes, car toppers, or the like, are portable storage containers that can be secured to the top of an automobile on an as-needed basis. Such cargo carriers may be secured to structural elements, such as mounting brackets, roof racks, side rails, crossbars, or the like. These structural elements are typically integrated components that are permanently secured to the roof of the vehicle.

One problem encountered in the arts is that the roofs of the many different vehicle models vary significantly in shape, size and profile. Accordingly, some cargo carriers may only be suitable for a particular vehicle model. Universal cargo carriers are available, but their application may still be limited to a number of different vehicle models.

Many vehicles do not include permanently secured structural elements. Glass tops and/or glass sun roofs are becoming increasingly popular in the automotive industry. Further, there is a trend away from including permanently secured structural elements on new vehicles, especially sport cars. Accordingly, most commercially available cargo carriers are simply unsuitable for use in vehicles that do not have permanently secured structural elements.

Accordingly, in the arts of automobile cargo carriers, there is a need in the arts for an improved methods, apparatus, and systems for permanently or releasably securing a cargo carrier to the top of an automobile while maintaining the required safety standards and providing methods to prevent theft.

SUMMARY OF THE INVENTION

Embodiments of active cargo carrier mounting system secure a cargo carrier to a surface of a vehicle using at least one vacuum pump controllably coupled to a plurality of vacuum cups configured to secure the active cargo carrier mounting system to the surface of the vehicle.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
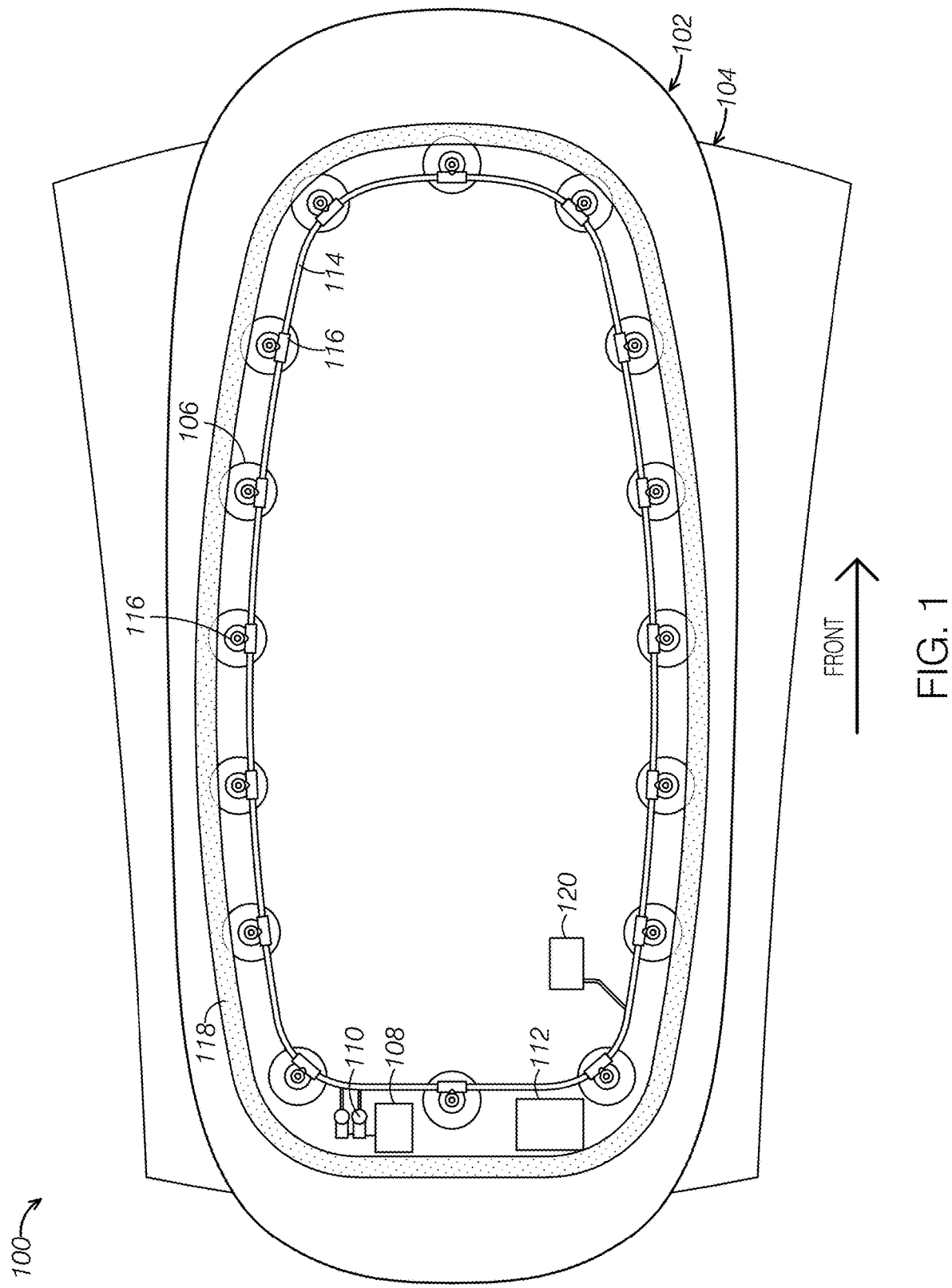
FIG. 1 is a partially transparent top view of an active cargo carrier mounting system.

FIG. 1 is a partially transparent top view of an active cargo carrier mounting system 100. In the non-limiting example embodiment, the active cargo carrier mounting system 100 is coupled to a cargo carrier 102. In some embodiments, suitable fasteners may be used to secure the cargo carrier to the active cargo carrier mounting system 100. Suitable fasteners may include snaps, buttons, straps, belts with buckles, hook and loop fasteners, zippers or the like. In other embodiments, the cargo carrier and the active cargo carrier mounting system 100 are fabricated as a unibody integrated system.

When the user wishes to use the cargo carrier, the active cargo carrier mounting system 100, in a preferred embodiment, may be permanently secured to the vehicle roof 104. Alternatively, the active cargo carrier mounting system 100 may be releasably secured to the vehicle roof. When the user is not using the cargo carrier, the active cargo carrier mounting system 100 is released from the vehicle roof 104 so that the active cargo carrier mounting system 100, preferably with an integrated cargo carrier, can be removed from the vehicle on command via a hand held device and/or an internal switch.

An unexpected advantage provided by embodiments of the active cargo carrier mounting system 100 is to improve safety in using cargo carriers and by providing antitheft protection. The vacuum cups 106 (interchangeably referred to herein as suction cups 106) of the active cargo carrier mounting system 100 provide a stronger securing means for securing the cargo carrier 102 than legacy securing means. Additionally, the active cargo carrier mounting system 100 is tamper resistant and cannot be easily removed by a thief.

The disclosed systems and methods for securing a cargo carrier to a vehicle roof 104 using the active cargo carrier mounting system 100 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods for securing a cargo carrier to a vehicle roof 104 using the active cargo carrier mounting system 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

"Communicatively coupled" means that an electronic device is communicatively connected to another electronic device, either wirelessly or with a wire based connector, whether directly or indirectly through a communication network. "Controllably coupled" means that an electronic device controls operation of another electronic device.

Returning to FIG. 1, the active cargo carrier mounting system 100 comprises a microcontroller 108, one or more vacuum pumps 110, a battery 112, a vacuum line 114, a plurality of vacuum cups 106, a plurality of tee fittings 116, an outer seal 118, and at least one optional pressure sensor 120. Any suitable processor-based 108 may be used in the various embodiments.

In a preferred embodiment, each vacuum cup 106 is fluidly coupled to the vacuum line 114 using a tee fitting. A first end of the tee fitting 116 is fluidly coupled to a proximal point in the vacuum line 114. A second end of the tee fitting 116 is coupled to an inlet of a vacuum cup 106. A third end of the tee fitting 116 is fluidly coupled to a continuing portion of the vacuum line 114. The continuing portion of the vacuum line 114 is fluidly coupled to a next one of the plurality of vacuum cups 106 using a tee fitting 116. Accordingly, a plurality of vacuum cups 106 may be fluidly connected to the vacuum line 114 in a serial fashion or other manner Other embodiments may couple the plurality of vacuum cups 106 to one or more vacuum lines using alternative fluid couplers.

In a preferred embodiment, an outer seal 118 forms a seal between a lower surface of the cargo carrier 102 and the vehicle roof. The outer seal 118 is a suitable semi-rigid or flexible foam-like material that generally conforms to the shape and size of the outer perimeter the active cargo carrier mounting system 100 and/or the cargo carrier. In a preferred embodiment, the outer seal 118 is made of neoprene, rubber, rubberized foam, or the like of a suitable thickness (height) that is sufficient to create a cavity between the lower surface of the cargo carrier 102 and the vehicle roof. Accordingly, the active cargo carrier mounting system 100 fits between the lower surface of the cargo carrier 102 and the vehicle roof, and is surrounded by the outer seal.

In a non-limiting example embodiment, a suitable adhesive may be used to secure the outer seal 118 to the cargo carrier 102 and/or the vehicle roof. In other embodiments, the seal 118 may be secured using other means, such as hardware. In a preferred embodiment, the outer seal 118 forms a continuous ring of material surrounding the active cargo carrier mounting system 100. In other embodiments, a non-continuous ring of material is used for the outer seal. Alternatively, or additionally, strips of material placed at selected locations may be used to form the outer seal.

In some embodiments, the outer seal 118 is not secured to either the lower surface of the cargo carrier 102 and the vehicle roof 104 or the vehicle roof. Rather, after the active cargo carrier mounting system 100 is placed in position over the vehicle roof, the outer seal 118 is placed on the vehicle roof 104 around the active cargo carrier mounting system 100. Then, the cargo carrier 102 is placed on the vehicle roof, resting on a top surface of the outer seal.

In the various embodiments, in response to actuation of the active cargo carrier mounting system 100, air is drawn out from the plurality of vacuum cups. The plurality of vacuum cups 106 partially collapse, decreasing their height as the vacuum within the vacuum cups 106 is created. Since the bottom of the cargo carrier 102 is secured to the active cargo carrier mounting system 100, the downward collapse of the vacuum cups 106 pulls the lower surface of the cargo carrier 102 downward. Accordingly, the outer seal 118 is compressed to form a frictional seal between the lower surface of the cargo carrier 102 and the vehicle roof. Since the vacuum cups 106 are within the cavity formed by the compressed seal, the vacuum cups 106 are protected from weather and moving air over the vehicle roof 104 as the vehicle is moving. That is, since the outer seal 118 is made of a flexible and air tight material such as neoprene or the like, the outer seal 118 serves to diffuse air away from the vacuum cups 106 to avoid disturbance to the vacuum cups 106 while the vehicle is moving. By protecting the seal of the vacuum cups 106 to the vehicle roof, power requirements on the vacuum pumps 110 may be decreased. Further, reliability may be increased to the leading edge vacuum cups 106 that may otherwise experience the greatest "lift" during vehicle movement.

In a preferred embodiment, the outer seal 118 is initially provided as a sheet of material that the user may cut to a desired shape and size. Alternatively, or additionally, a pre-cut outer seal 118 may be provided that is cut based on the dimensions of the active cargo carrier mounting system 100, the cargo carrier, and/or the user's vehicle model.

In practice, the user places the active cargo carrier mounting system 100 onto the vehicle roof 104 and adjusts the location of the plurality of vacuum cups 106 to a desired location on the vehicle roof. Next, the user actuates the active cargo carrier mounting system 100 to cause the controller to operate a vacuum pump 110 to create a vacuum within the vacuum line. The created vacuum then draws air from the underside of each vacuum cup 106 to create a vacuum. The generated vacuum then seals the vacuum cup 106 to the top surface of the vehicle roof 104 so long as the vacuum is maintained. Accordingly, the integrated cargo carrier of the active cargo carrier mounting system 100 is then secured to the vehicle roof.

Preferably, when the vehicle has a glass top, the plurality of vacuum cups 106 are located over the glass top. A relatively strong seal is created between each vacuum cup 106 (and the intervening outer seal) and the smooth glass surface of the vehicle's glass top. Alternatively, the plurality of vacuum cups 106 may be secured to a painted surface of a metal vehicle roof. Further, the active cargo carrier mounting system 100 can be used to secure a cargo carrier 102 to other surfaces of a vehicle, such as a vehicle trunk, side, or other surface.

The cargo carrier 102 may be a box-like structure configured to store items within the interior of the cargo carrier. Alternatively, the cargo carrier 102 may be a rack or other securing device that may be used to secure other objects of interest, such as bikes, surfboards, fishing equipment, golf clubs, tools, ladders, or the like, to the vehicle roof.

A preferred embodiment has two or more vacuum pumps. Multiple vacuum pumps 110 provide for reliability in the event of a single vacuum pump 110 failure. Also, multiple vacuum pumps 110 can be used together to create a stronger vacuum.

In an example embodiment, a pressure sensor 120 is located within the active cargo carrier mounting system 100 to sense vacuum pressure. The pressure sensor 120 is communicatively coupled to the microcontroller. The pressure sensor 120 may be a separate component located along the vacuum line, at a vacuum pump, within a vacuum cup, and/or at a tee fitting. Alternatively, or additionally, the pressure sensor 120 may be an integrated component of the vacuum pump.

The microcontroller, in an example embodiment, monitors the vacuum pressure generated by the vacuum pump(s). The microcontroller 108 is controllably coupled to the vacuum pump(s) to control the vacuum pump(s) to maintain a desired vacuum pressure in the vacuum line. Accordingly, the vacuum pressure within each of the plurality of vacuum cups 106 can be controlled to a desired pressure value. For example, the vacuum within the plurality of vacuum cups 106 and the vacuum line 114 will vary with vehicle elevation. In instances where the user drives the vehicle to a higher elevation, or to a lower elevation, the microcontroller 108 may operate the vacuum pump(s) to adjust and/or maintain the vacuum pressure to the desired target pressure value as the elevation of the vehicle changes during the trip. As another example, the vacuum pressure may be varied as a function of vehicle velocity. Here, a higher vacuum pressure may be generated at higher vehicle velocities.

The microcontroller 108 includes, or is coupled to, a wireless communication system that enables communication between the active cargo carrier mounting system 100 and the user's portable hand held electronic device, such as a smart phone, notebook, or the like. Alternatively, or additionally, the microcontroller 108 may be communicatively coupled to a control system of the vehicle. In a preferred embodiment, the user may use their portable hand held electronic device and/or the vehicle control system to operate and/or monitor performance of the active cargo carrier mounting system 100.

The battery 112 provides power for operation of the vacuum pump(s) and/or the microcontroller. In a preferred embodiment, a plurality of interchangeable batteries may be available to the user. For example, a first battery 112 may be used to operate the active cargo carrier mounting system 100 during a trip. A second battery 112 may be held in reserve, and/or may be charged using the vehicle's electric system.

In a preferred embodiment, the microcontroller 108 monitors battery power that is currently available from the battery. If battery power decreases below a threshold, a warning notification may be communicated from the microcontroller 108 to the portable hand held electronic device and/or the vehicle control system. In some embodiments, power management recommendation may be made to the user so that they can manage their trip. For example, if a low battery condition occurs, or if a low battery condition can be projected to occur in the near future, the user may halt their trip to replace the battery 112 and also perform other actions, such as stopping at a rest stop, eating at a restaurant, and/or filling up their vehicle with gas.

In some embodiments, the active cargo carrier mounting system 100 may be coupled to the electric system of the vehicle. For example, a power cord or the like may couple the active cargo carrier mounting system 100 and the vehicle electric power system.

Figure 2:
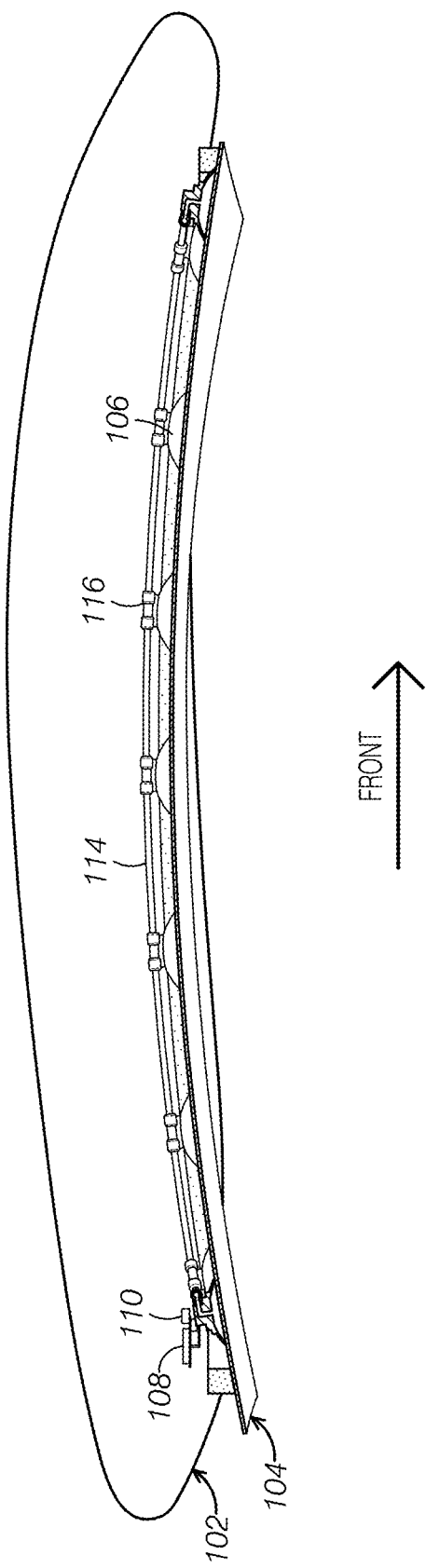
FIG. 2 is a side view of an active cargo carrier mounting system secured to a vehicle roof top.

FIG. 2 is a side view of an active cargo carrier mounting system 100 secured to a vehicle roof 104 top.

Figure 3:
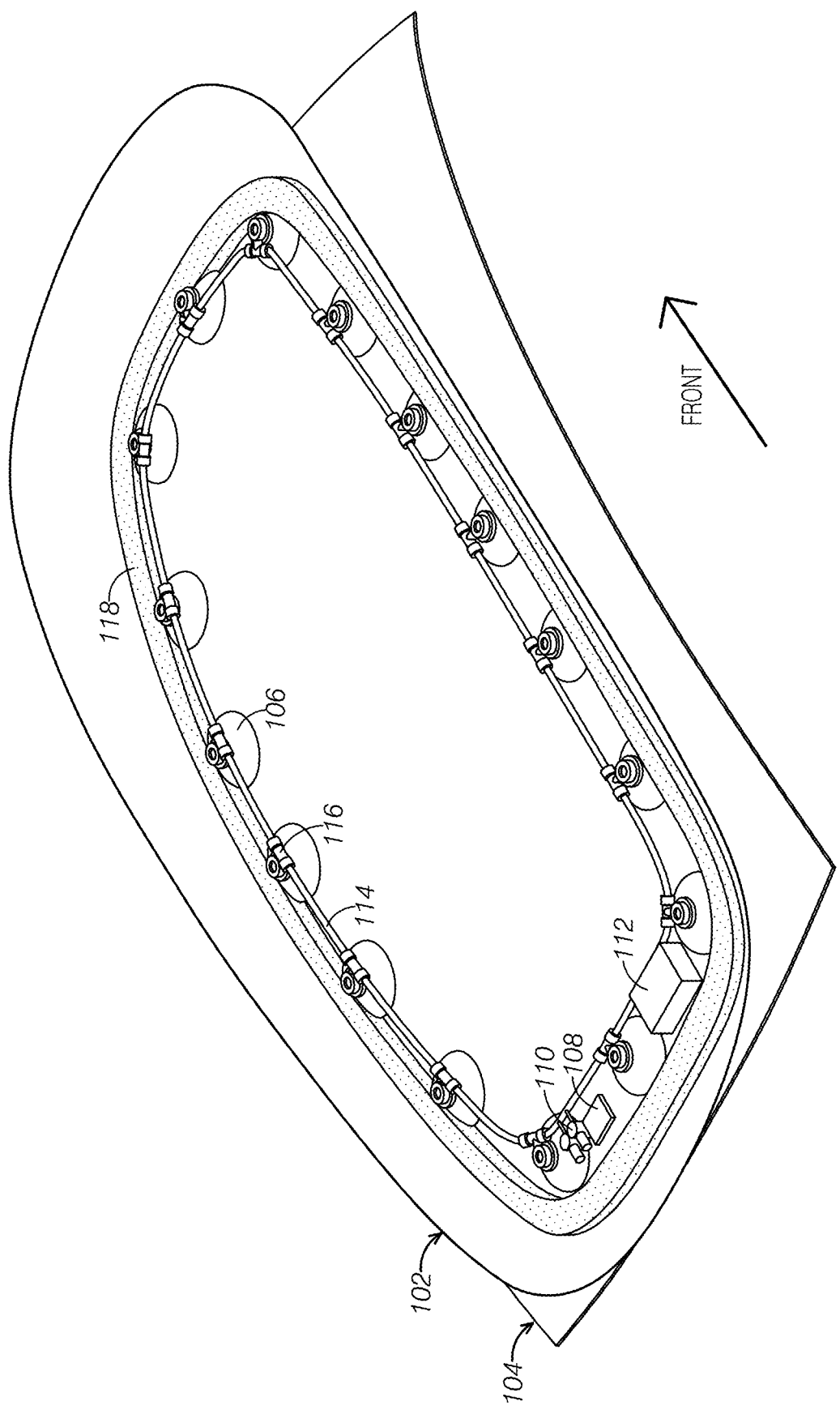
FIG. 3 is a partially transparent perspective view of an active cargo carrier mounting system.
Figure 4:
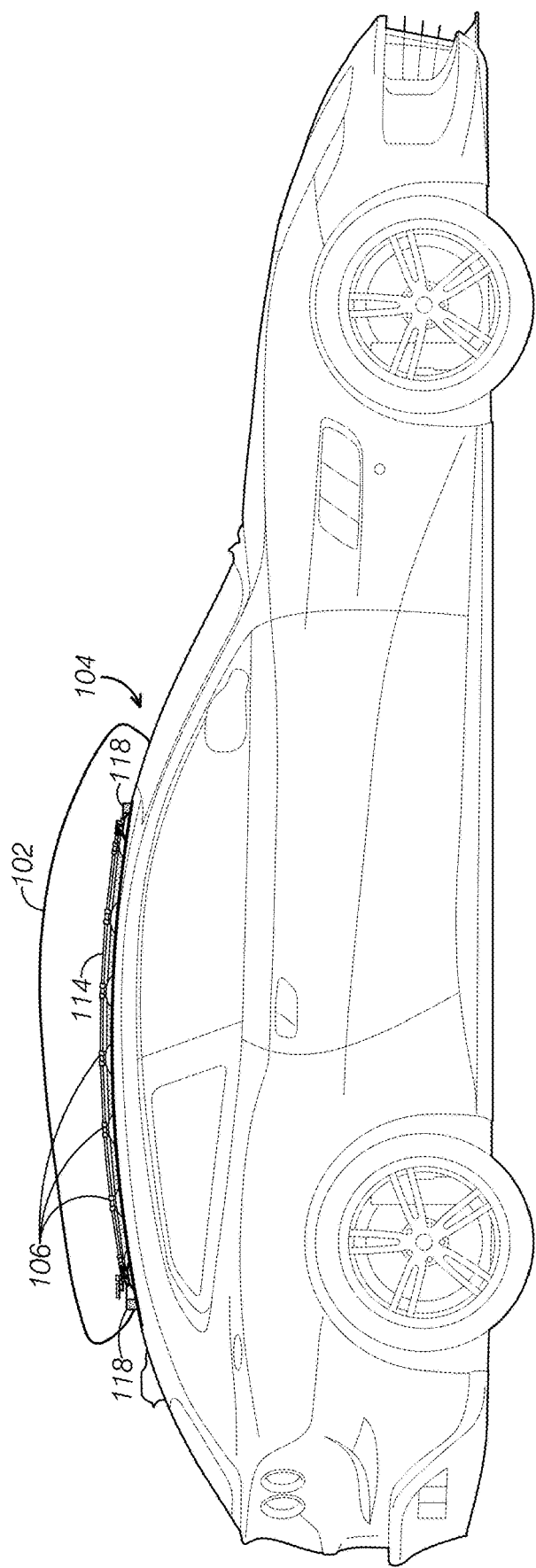
FIG. 4 is a drawing of a side view of an active cargo carrier mounting system 100 secured to a roof top of a vehicle.

FIG. 3 is a partially transparent perspective view of an active cargo carrier mounting system 100. FIG. 4 is a drawing of a side view of an active cargo carrier mounting system 100 secured to a roof top of a vehicle. Here, the cargo carrier 102 is relatively large, wherein a leading edge of the cargo carrier 102 extends some distance beyond the roof line of the vehicle roof. Here, the leading vacuum cups 106 firmly secure the leading portion of the cargo carrier 102 to the vehicle roof.

In other embodiments, the cargo carrier 102 may be relatively small. The smaller active cargo carrier mounting system 100 may be releasably secured to the larger vehicle roof 104 at any suitable desired location. In practice, multiple cargo carriers (each with their own active cargo carrier mounting system 100) may be secured onto the vehicle roof. Alternatively, a single active cargo carrier mounting system 100 may be used to secure multiple cargo carriers. For example, two cargo carriers may be mounted side by side, or end to end, on the vehicle roof. The use of multiple cargo carriers may enable the user to sort the contents of each cargo carrier 102 in any desired manner. For example, one cargo carrier 102 might be used to carry water toys or scuba equipment, while the other cargo carrier 102 may be used to store dry clothes.

Figure 5:
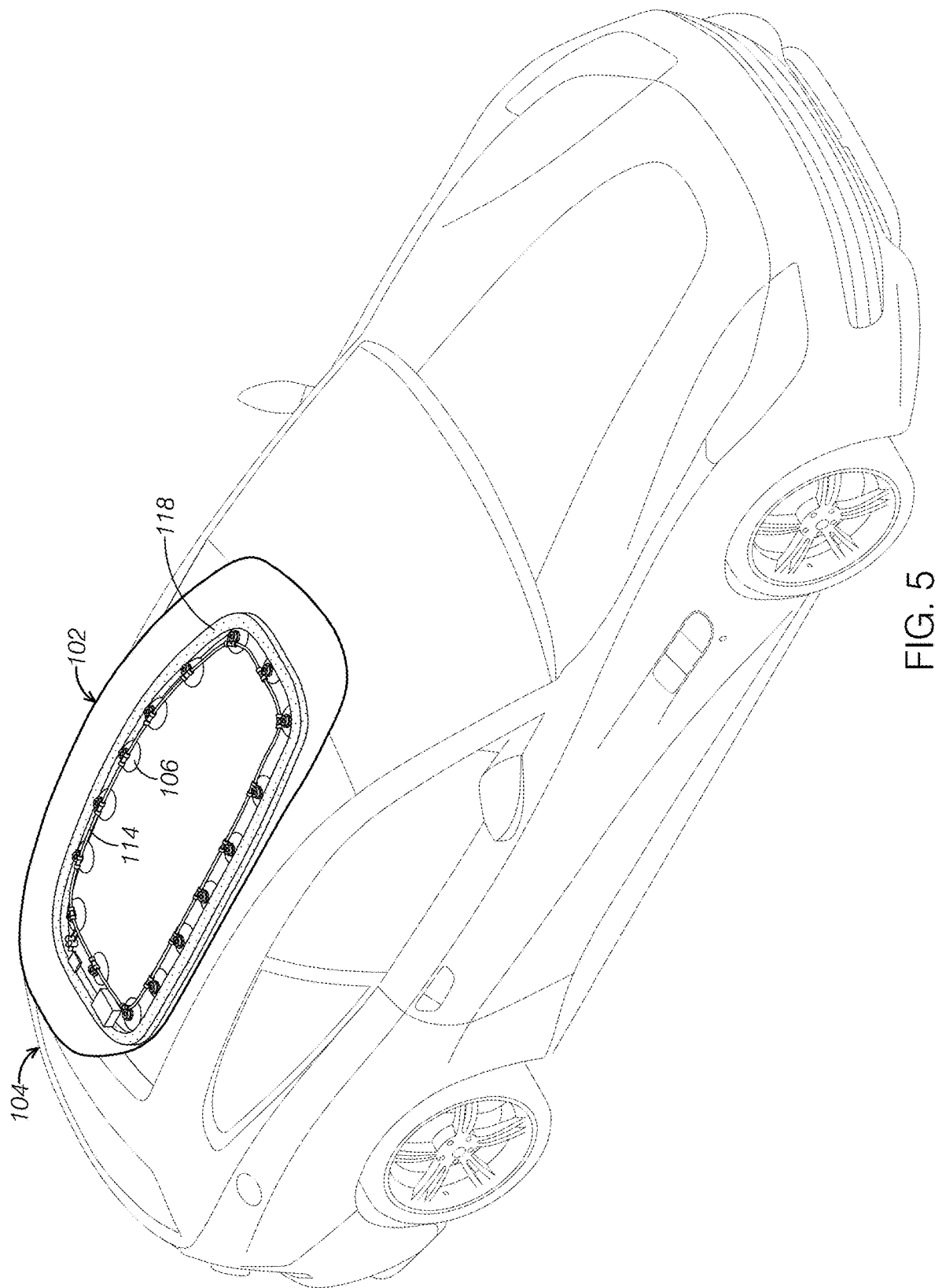
FIG. 5 is a drawing of a perspective view of an active cargo carrier mounting system secured to a roof top of a vehicle.
Figure 6:
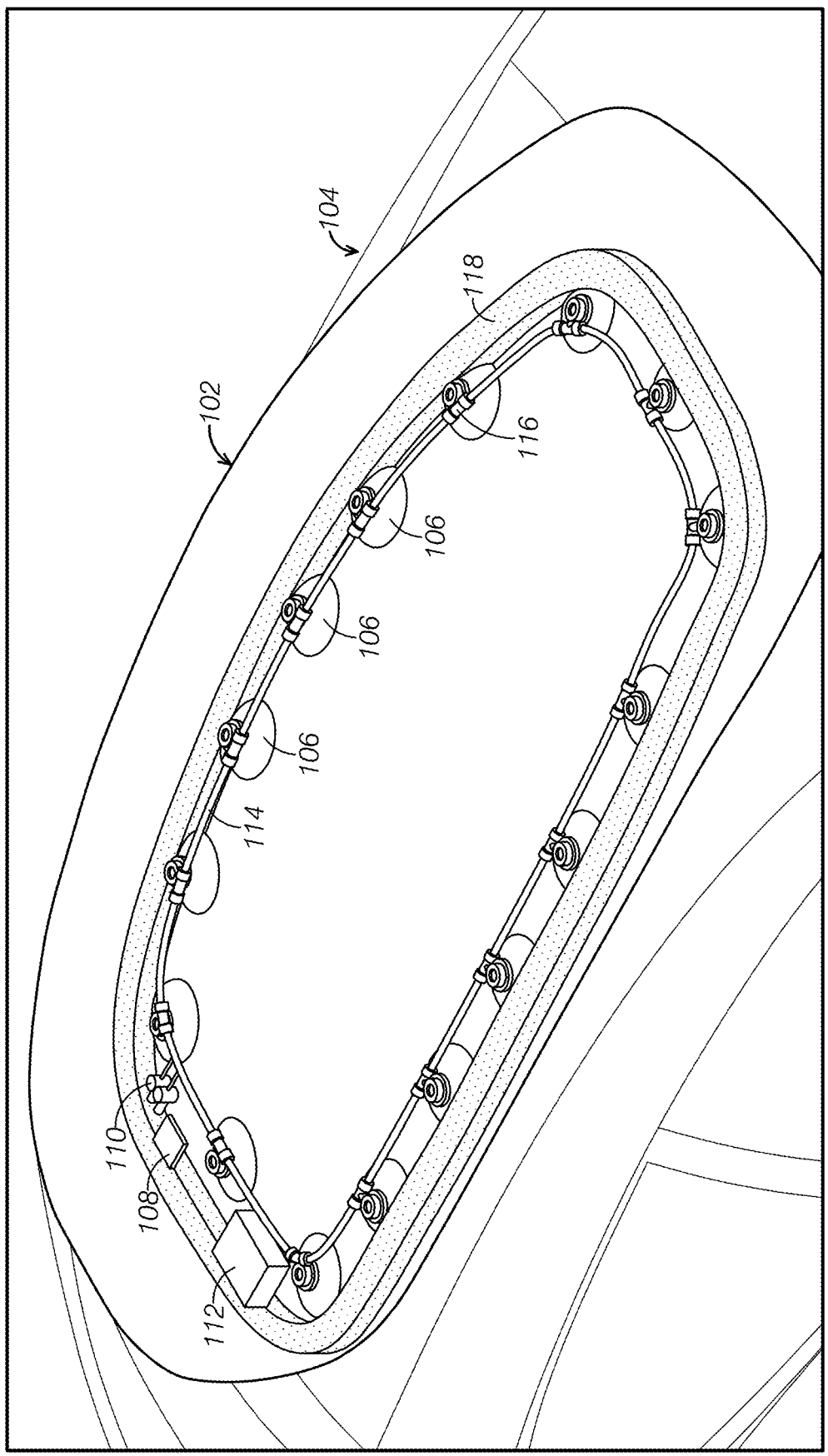
FIG. 6 is a partially transparent perspective front view of an active cargo carrier mounting system secured to a roof top of the vehicle of FIG. 5.
Figure 7:
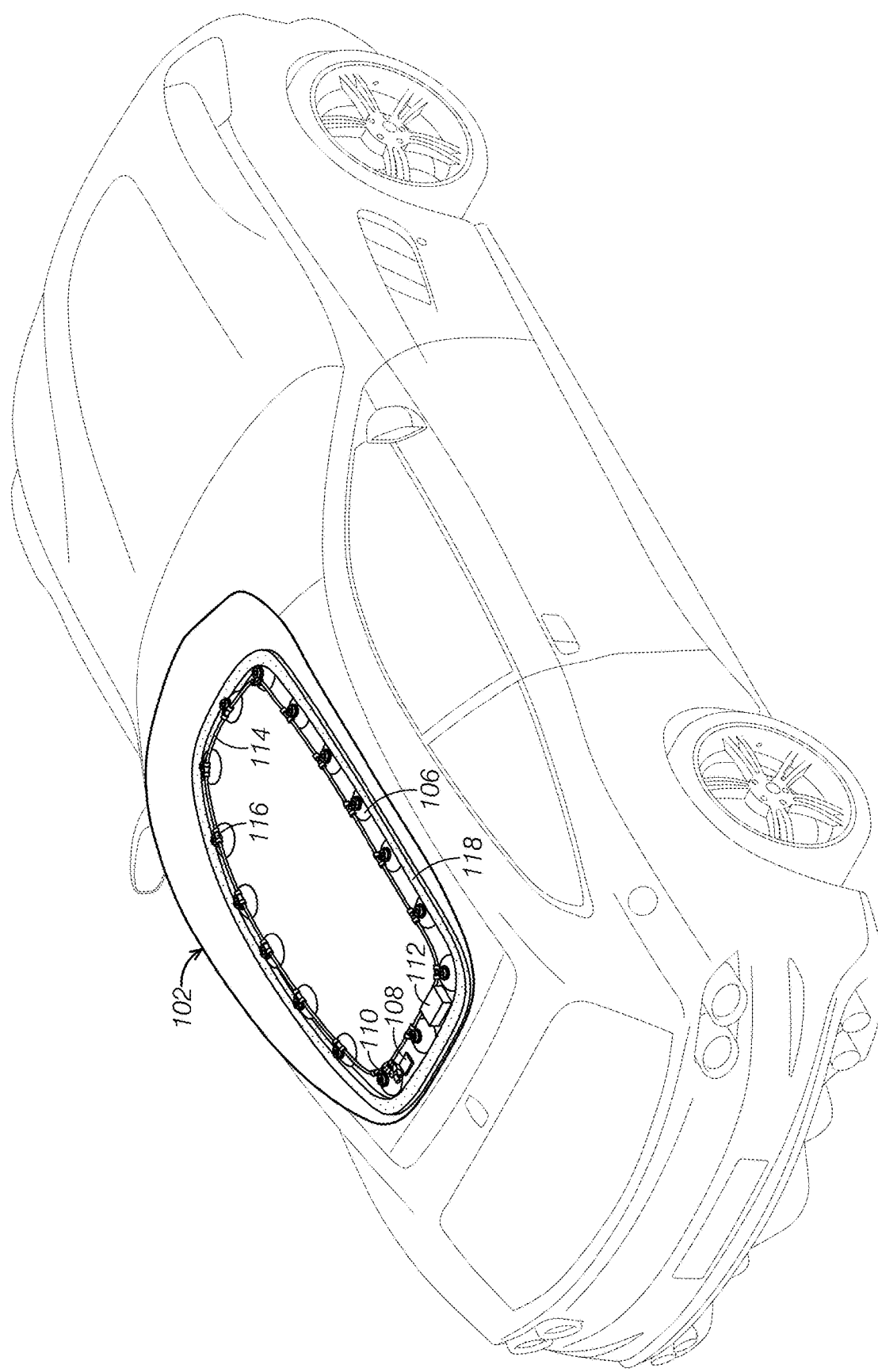
FIG. 7 is perspective rear view of an active cargo carrier mounting system secured to a roof top of the vehicle of FIG. 5.
Figure 8:
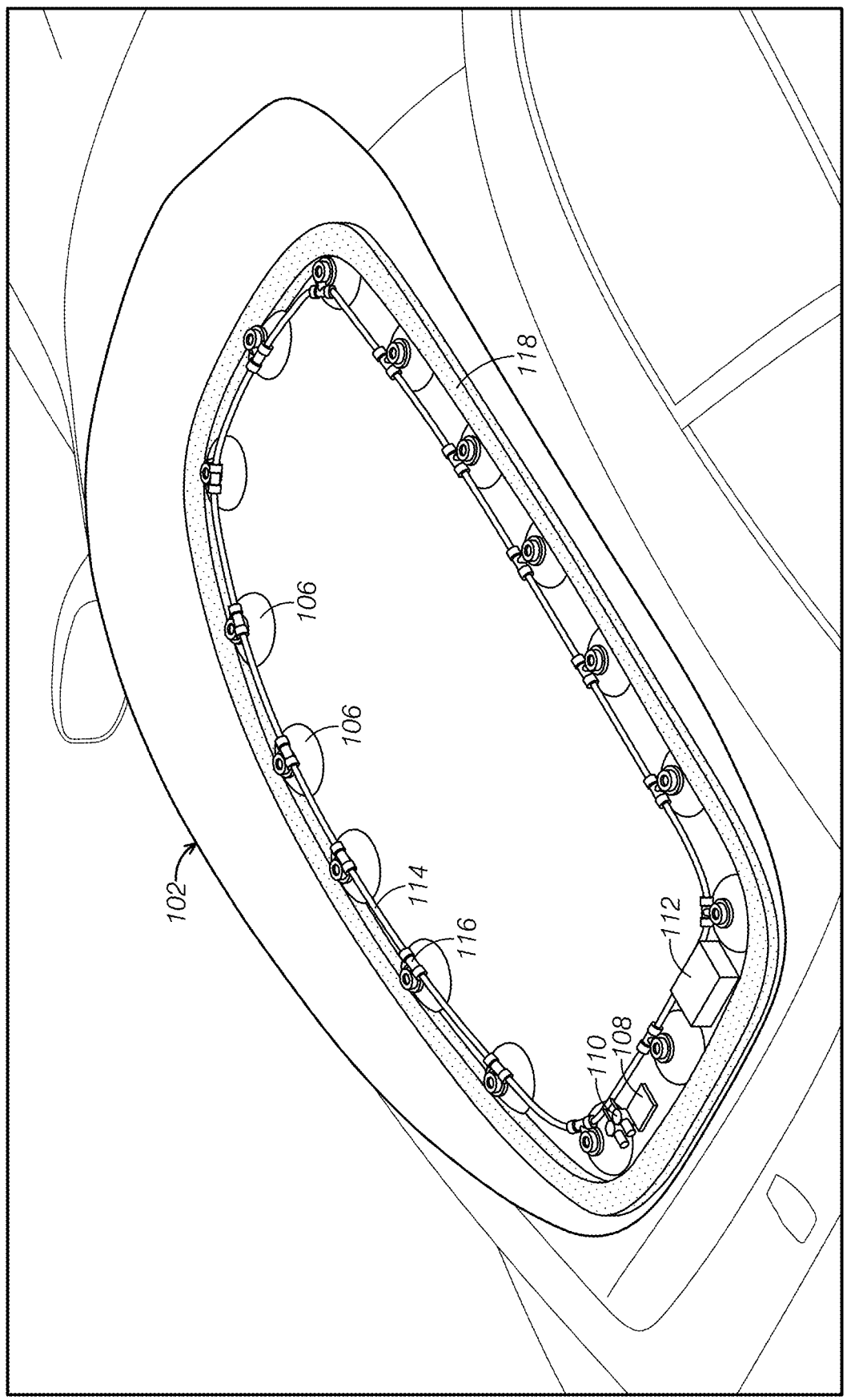
FIG. 8 is a partially transparent perspective view of an active cargo carrier mounting system secured to a roof top of the vehicle of FIG. 7.

FIG. 5 is a drawing of a perspective view of an active cargo carrier mounting system 100 secured to a roof top of a vehicle. FIG. 6 is a partially transparent perspective front view of an active cargo carrier mounting system 100 secured to a roof top of the vehicle of FIG. 5. FIG. 7 is perspective rear view of an active cargo carrier mounting system 100 secured to a roof top of the vehicle of FIG. 5. FIG. 8 is a partially transparent perspective view of an active cargo carrier mounting system 100 secured to a roof top of the vehicle of FIG. 7.

An unexpected advantage of embodiments of the active cargo carrier mounting system 100 is that a single product may be suitable for securing a particular cargo carrier 102 to many different vehicle models and brands. The advantage is even greater when the cargo carrier 102 is made of a semirigid material so that the active cargo carrier mounting system 100 can be secured to different vehicle roof 104 profiles.

Further, the number of and/or location of the plurality of vacuum cups 106 may be defined based on the known shape and profile of the vehicle roof, and/or based on the shape and size of the cargo carrier 102 that is based on the needs of the user, weight of the cargo load, vehicle speed, duration of trips, and/or geographic locations of travel. In some embodiments, the user may modify the number of and/or location of the vacuum cups 106 being used to secure the active cargo carrier mounting system 100.

In some embodiments, two or more vacuum lines 114 may be used to provide vacuum to selected vacuum cups 106. Using multiple vacuum lines 114 improves reliability in the event that there is a failure of one of the vacuum lines 114. In a preferred embodiment, each vacuum cup 106 and/or tee fitting 116 includes an internal shut off valve that can isolate a failed vacuum cup 106 from the vacuum line 114 in the event of a failure. Further, a user notification may be sent by the microcontroller 108 to the user's portable hand held electronic device and/or the vehicle control system to warn the user of the failure. Accordingly, the user may pull off the road to resolve the vacuum line failure.

It should be emphasized that the above-described embodiments of the active cargo carrier mounting system 100 are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

The invention claimed is:

1. A cargo carrier mounting system configured to be secured to a cargo carrier, comprising:
   a vacuum pump;
   a plurality of vacuum cups fluidly coupled to the vacuum pump, wherein each one of the plurality of vacuum cups are configured to be uniquely located on a surface of a vehicle by a user who is securing the active cargo carrier mounting system to the surface of the vehicle; and
   a microcontroller controllably coupled to the vacuum pump,
   wherein a vacuum generated by the vacuum pump creates the vacuum in each one of the plurality of vacuum cups that are fluidly coupled to the vacuum pump,
   wherein each one of the plurality of vacuum cups are secured to the surface of the vehicle by the vacuum created in each one of the plurality of vacuum cups, and
   wherein the microcontroller actuates the vacuum pump to generate the vacuum.

2. The system of claim 1, wherein the microcontroller monitors a vacuum pressure of the vacuum generated by the vacuum pump, and wherein the microcontroller controls the vacuum pump so that the vacuum is maintained by the vacuum pump at a desired pressure value.

3. The system of claim 2, wherein the microcontroller is communicatively coupled to a portable hand held electronic device of the user, and wherein the microcontroller actuates the vacuum pump to generate the vacuum in response to receiving a communication from the portable hand held electronic device of the user.

4. The system of claim 3, wherein the microcontroller communicates a notification to the portable hand held electronic device in response to detecting a vacuum failure.

5. The system of claim 2, wherein the microcontroller is communicatively coupled to a control system of the vehicle, and wherein the microcontroller actuates the vacuum pump to generate the vacuum in response to receiving a communication from the control system of the vehicle.

6. The system of claim 5, wherein the microcontroller communicates a notification to the control system of the vehicle in response to detecting a vacuum failure.

7. The system of claim 1, wherein the vacuum pump is a first vacuum pump that creates a first vacuum, wherein the plurality of vacuum cups are a first plurality of vacuum cups, the system further comprising:
   a second plurality of vacuum cups; and
   a second vacuum pump;
   wherein a second vacuum created by the second vacuum pump creates a second vacuum in each one of the second plurality of vacuum cups, and
   wherein each one of the second plurality of vacuum cups are secured to the surface of the vehicle by the vacuum created in each one of the second plurality of vacuum cups.

8. The system of claim 1, further comprising:
   a battery coupled to at least the vacuum pump to provide power to the vacuum pump,
   wherein the microcontroller is communicatively coupled to the battery,
   wherein the microcontroller monitors battery power that is currently available from the battery, and
   wherein the microcontroller generates a warning notification in response to the battery power decreasing below a threshold.

9. The system of claim 1, wherein the microcontroller is communicatively coupled to a control system of the vehicle, and wherein the microcontroller communicates the warning notification to the control system of the vehicle.

10. The system of claim 1, wherein the microcontroller is communicatively coupled to a portable hand held electronic device of the user, and wherein the microcontroller communicates the warning notification to the portable hand held electronic device of the user.

11. A mounting system configured to be secured to a first surface, comprising:
   a vacuum pump;
   a plurality of vacuum cups fluidly coupled to the vacuum pump and coupled to a second surface, wherein each one of the plurality of vacuum cups are configured to be uniquely located on the first surface by a user who is securing the mounting system to the first surface; and
   an outer seal,
   wherein the outer seal is located between the first surface and the second surface, and surrounds the plurality of vacuum cups, wherein a vacuum generated by the vacuum pump creates the vacuum in each one of the plurality of vacuum cups that are fluidly coupled to the vacuum pump, and wherein each one of the plurality of vacuum cups are secured to the first surface by the vacuum created in each one of the plurality of vacuum cups.

12. The system of claim 11, wherein the outer seal is made of flexible foam-like material having a predefined thickness that is sufficient to create a cavity between the first surface and the second surface such that at least the plurality of vacuum cups fit within the cavity, and wherein the outer seal is compressed between the first surface and the second surface in response to creating the vacuum in each one of the plurality of vacuum cups.

13. The system of claim 12, wherein the outer seal is secured between the first surface and the second surface by a compressive force that is generated in response to creating the vacuum in each one of the plurality of vacuum cups.

14. The system of claim 12, wherein the outer seal is made of a continuous ring of the flexible foam-like material.

15. The system of claim 11, further comprising:

a microcontroller controllably coupled to the vacuum pump, wherein the microcontroller actuates the vacuum pump to generate the vacuum.

16. The system of claim 15, wherein the microcontroller monitors a vacuum pressure of the vacuum generated by the vacuum pump, and wherein the microcontroller controls the vacuum pump so that the vacuum is maintained by the vacuum pump at a desired pressure value.

17. A method of mounting an active cargo carrier mounting system to a surface of a vehicle, wherein the active cargo carrier mounting system uses a plurality of vacuum cups configured to secure the active cargo carrier mounting system to the surface of the vehicle, wherein the plurality of vacuum cups of the active cargo carrier mounting system are each coupled to a vacuum pump, and wherein the active cargo carrier mounting system is secured to a cargo carrier, the method comprising:

receiving, at a microprocessor, a user actuation of the active cargo carrier mounting system;

actuating the vacuum pump in response to receiving the actuation of the active cargo carrier mounting system; and creating a vacuum created by the vacuum pump that creates the vacuum in each one of the plurality of vacuum cups that are each fluidly coupled to the vacuum pump, wherein each one of the plurality of vacuum cups become secured to the surface of the vehicle by the vacuum.

18. The method of claim 17, further comprising:

placing the active cargo carrier mounting system with the cargo carrier on surface of the vehicle prior to receiving the actuation of the active cargo carrier mounting system so that each of the plurality of vacuum cups of the active cargo carrier mounting system rests on the surface of the vehicle.

19. The method of claim 17, wherein an outer seal is made of flexible foam-like material having a predefined thickness that is sufficient to create a cavity between a surface of the cargo carrier and the surface of the vehicle such that the active cargo carrier mounting system fits between the surface of the cargo carrier and the rooftop of the vehicle, and wherein the outer seal surrounds the plurality of vacuum cups, the method further comprising:

compressing the outer seal between the surface of the cargo carrier and the surface of the vehicle in response to creating the vacuum in each one of the plurality of vacuum cups.

20. The method of claim 17, further comprising:

monitoring a vacuum pressure generated by the vacuum pump, and controlling the vacuum pump to maintain the vacuum pressure to a predefined vacuum pressure.

\* \* \* \* \*